United States Patent [19]

Dorsch et al.

[11] Patent Number: 4,579,758

[45] Date of Patent: Apr. 1, 1986

[54] INTERNALLY COATED REACTION VESSEL FOR USE IN OLEFINIC POLYMERIZATION

[75] Inventors: John L. Dorsch, Amherst; John D. Smith, Sheffield Lake, both of Ohio

[73] Assignee: The B. F. Goodrich Company, New York, N.Y.

[21] Appl. No.: 469,325

[22] Filed: Feb. 24, 1983

Related U.S. Application Data

[62] Division of Ser. No. 225,589, Jan. 16, 1981, abandoned.

[51] Int. Cl.$^4$ .......................... C07D 7/22; C07D 7/24; C23F 15/00
[52] U.S. Cl. ..................................... 428/35; 427/230; 526/62
[58] Field of Search .................. 428/35, 436, 460; 427/230, 236

[56] References Cited

U.S. PATENT DOCUMENTS

| | | |
|---|---|---|
| 4,024,301 | 5/1977 | Witenhafer .......................... 526/62 |
| 4,068,059 | 1/1978 | Witenhafer ....................... 526/344.2 |
| 4,142,033 | 2/1979 | Witenhafer .......................... 526/62 |
| 4,200,712 | 4/1980 | Cohen ................................. 526/62 |
| 4,320,215 | 3/1982 | Yonezawa ............................ 526/62 |

Primary Examiner—Christopher A. Henderson
Attorney, Agent, or Firm—Joe A. Powell

[57] ABSTRACT

This invention relates to a polymerization reaction vessel having a coating on the inner surfaces thereof resulting from applying thereto an aqueous coating solution of an alkali metal or ammonium salt of the reaction product or oligomers of an aromatic aldehyde, such as benzaldehyde, and the like, and a polyhydric phenol, such as resorcinol, and the like. When polymerizing olefinic monomers, such as vinyl halides, vinylidene halides, and vinylidene monomers having at least one terminal $CH_2=CH<$ group, and mixtures thereof, while a contact with said coating, polymer buildup on the inner surfaces of the reaction vessel is substantially eliminated.

1 Claim, No Drawings

INTERNALLY COATED REACTION VESSEL FOR USE IN OLEFINIC POLYMERIZATION

This is a division of application Ser. No. 225,589, Jan. 16, 1981 abandoned.

BACKGROUND OF THE INVENTION

In the commercial production of polymers and copolymers of vinyl and vinylidene halides, when polymerized alone or with other vinylidene monomers having a terminal $CH_2=C<$ group, or with polymerizable polyolefinic monomers, the buildup of polymer on the internal surfaces of the reactor is not only troublesome but costly. For example, when polymerizing vinyl chloride, and other comonomers when used, the same are maintained in the form of discrete droplets in an aqueous suspension by the use of suspending agents and agitation. When the reaction is complete, the resultant polymer, or PVC, is washed and dried. However, these suspension systems are often not as stable as they should be and during the polymerization reaction, vinyl chloride polymer builds up on the interior surfaces of the reactor, including the surfaces of the baffles and agitator. Obviously, this polymer buildup must be removed since it results in further formation of polymer buildup which in turn results in a crust that adversely affects heat transfer and contaminates the polymer being produced. While various methods have heretofore been proposed to reduce the amount and nature of polymer buildup on polymerization reactor surfaces, such as solvent cleaning, various hydraulic and mechanical reactor cleaners, and the like, none has proved to be the ultimate in polymer buildup removal. That is to say, these various methods and apparatus have done an acceptable job but there is still room for improvement in this area, particularly from an economic point of view.

Various methods have been proposed to prevent, or substantially eliminate, the formation of the polymer buildup in the first instance. For example, it has been proposed to coat the internal surfaces of the reactor with various polymer buildup resistant coating materials. For example, in U.S. Pat. Nos. 4,024,330 and 4,024,301, various polyaromatic amines are shown as useful for coating reactors to substantially eliminate buildup. Alkali soluble dyes have been shown to be useful for this purpose in U.S. Pat. No. 4,068,059. Further, in U.S. Pat. No. 4,080,173 there is shown and described the use of selfcondensed polyhyd2ric phenols and polyhydric naphthols as useful coating materials to prevent polymer buildup. While all these coating materials give good to excellent results, the search continues for new and improved polymer buildup resistant materials with which to coat reactors for the purpose of preventing or eliminating polymer buildup on the inner surfaces thereof.

Further, a recently published Japanese patent application discloses an interesting coating for polymerization reactors. This is Japanese patent application No. 127682/78, filed Oct. 17, 1978 in the name of Kanegafuchi Chem. K.K. and published Apr. 21, 1980 under Laid-open Gazette No. 55-054317. In this case the reactor is coated with the reaction product of pyrogallol or hydroxyhydroquinone alone, or other phenolic compounds containing either or both of them, with aromatic aldehydes. The reaction products are the acidic form and are dissolved in an organic solvent, such as methanol, and applied to the reactor surfaces and then dried. This is an expensive and cumbersome procedure, especially in large reactors. Drying is difficult and the solvent must be recovered, for economic reasons. It would be much more be more desirable to use an aqueous solution of such reaction products which did not have to be dried.

SUMMARY OF THE INVENTION

It has been found that polyhydric phenols and aromatic aldehydes can be reacted together to form oligomers the salts of which are soluble in water. The aqueous salt solutions are applied to the inner surfaces of a reactor forming an irreversible adsorptive coating on the surfaces which does not have to be dried and further, said coating can be rinsed with water, if so desired. The presence of said coating on the internal surfaces of the reactor substantially eliminates polymer buildup on said surfaces.

DETAILED DESCRIPTION

In accordance with the present invention, a film or coating of a coating material, or oligomer, made by the reaction of a polyhydric phenol and an aromatic aldehyde, is applied to the inner surfaces of a polymerization reactor or vessel in the form of the salt of the oligomer by merely contacting said surfaces with an aqueous alkaline solution of said coating material. All exposed surfaces in the interior of the reactor, such as the baffles, agitator or mixing mechanism, etc., and the condenser, when one is employed, are likewise coated in the same manner. After the coating solution has been applied to the inner surfaces of the reactor, the polymerization medium can be introduced into the reactor immediately and the reaction started without the necessity of drying said surfaces beforehand. The elimination of the drying is most important in the present invention. However, although optional, it is preferred, when after the application of the coating to the inner surfaces, that the surfaces are rinsed with water, such as by spraying, and the like, thereby, surprisingly, leaving on said surfaces a tightly adhering coating or film of the coating material which is not affected by the polymerization medium, even though said medium is vigorously agitated during the polymerization reaction.

The reaction between the polyhydric phenol and aromatic aldehyde, to form an oligomer, or mixture of oligomers of varying molecular weight, is a condensation reaction using a dehydration catalyst. If a mere bulk reaction between the polyhydric phenol and aromatic aldehyde is employed, the resulting product is a dimer which has a molecular weight too low for use as a coating material in the present invention. It is necessary to not only adjust the number or moles of each reactant carefully, but also to control mixing thereof and the reaction conditions to obtain the desired oligomers. The oligomers that are useful as coating materials, when the salt form thereof is employed, are those having the following general formula:

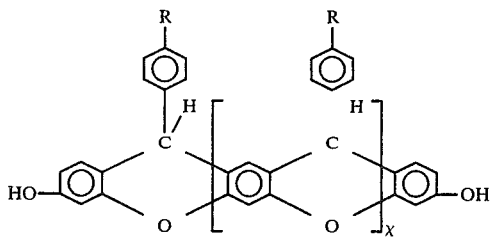

wherein R is selected from the group consisting of —H, and —OR' wherein R' is an alkyl group containing from 1 to 5 carbon atoms, and $\chi$ is an integer from 0 to 10. Among the materials that may be employed in making the reaction products, or oligomers, suitable as coating materials in the present invention are the polyhydric phenols, such as resorcinol, hydroquinone, catechol, phloroglucinol, and the like, and the aromatic aldehydes, such as benzaldehyde, 4-methoxy benzaldehyde, 4-ethoxy benzaldehyde, and the like. A good example of a coating material having the above general structure is that formed by the reaction of resorcinol and benzaldehyde.

This material, or reaction product, is obtained in accordance with the following general procedure. Resorcinol dissolved in 1,4-dioxane is added to a reaction vessel equipped with a water-cooled condenser and add funnel. The contents are agitated and sulfuric acid (catalyst) is added thereto. By means of the add funnel, benzaldehyde is added to the reaction mixture dropwise. Thereafter, the add funnel is removed and the reaction mixture is stirred and heated and refluxed for 2 hours at 115° to 120° C. Then the condenser is removed and replaced with a still-head and the water-dioxane is distilled over. Evidence that the desired xanthene structures are present in the product is provided by an intense green flouresence to UV light from the material in dilute methanol solution.

A number of compounds can be used to catalyze formation of the desired oligomers from polyhydric phenols and aliphatic aldehydes. As examples of such compounds, there may be named sodium hydroxide, zinc chloride, sulfuric acid, and the like. Other dehydrating agents can be employed as catalysts for the reaction.

Looking at the broad picture of preventing polymer buildup in a polymerization reactor, it is essential that the inner surfaces thereof are water-wettable. An ordinary solid surface, such as stainless steel, is not water-wettable due to the normal contamination of said surfaces with organic materials through contact with the atmosphere. The surfaces can be cleaned, such as with chromic acid or an abrasive cleanser, for example, and it will become water-wettable. However, such cleaning along does not solve the problem since the surfaces will not remain clean for a sufficient length of time, that is for more than the duration of a single polymerization cycle. This necessitates recleaning the surfaces after each polymerization cycle. Therefore, applying a coating to the surfaces which will be water-wettable and resist polymer buildup thereon and remain on said surfaces throughout multiple reaction cycles is most desirable.

When a metal or solid surface is non-wettable, a liquid thereon, such as water, will form droplets and not flow out into a smooth film. The angle formed between the tangent of the side of the droplet and the metal or glass surface is called the "contact angle" and is referred to as "theta" ($\theta$). A further measurement of the wettability of a solid surface is the critical surface tension for wetting a solid surface and is expressed as "$\gamma c$". The $\gamma c$ is measured in dynes per centimeter. Using water as the standard, in order for a solid surface to be wettable, $\theta$ must equal zero or be very close to it, and $\gamma c$ must be 72 dynes/cm. or greater.

More importantly, the material being applied to the surface should not only form a wettable surface, but also form a layer or film thereon which is not readily removable. This film adheres to the solid or metal surface by adsorption and in many cases, the film is a mono-layer of the coating material applied which is of the order of a molecule in thickness. These films, or coatings, of such thickness are invisible to the naked eye thus eliminating any color problem, such as is the problem with many coatings heretofore used for the same purpose. Of course, films of greater thickness can result when using higher solids content coating solutions, in accordance with the present invention, which films or coatings are visible to the naked eye. The film or layer formed by the coating solution is not removable by washing with water. That is to say, the coating or film is resistant to removal from the surfaces when a turbulent aqueous reaction medium is in contact therewith, caused by the agitation of the polymerization mixture in the reactor.

When reacting the polyhydric phenols and aromatic aldehydes, a concentrate of the resulting oligomers is formed which in turn is used to make the coating solution of the salts thereof. The coating solutions are made in a conventional manner, using heat and/or agitation where necessary. In making said solutions, usually a temperature in the range of about 20° C. to about 60° C. is satisfactory. Agitation during dissolution is desirable. As previously pointed out, the coating material is dissolved in an aqueous alkaline solution, preferably an aqueous sodium hydroxide solution. However, other aqueous alkaline solutions may be employed, such as, for example, potassium hydroxide, lithium hydroxide, ammonium hydroxide, and the like. It has been found that a concentration of coating material in the range of about 0.1% to about 5.0% by weight is satisfactory in accomplishing the objectives of the present invention. To insure against undesirable color, and for economic reasons, it is preferred to employ a concentration of coating material in said solutions in the range of about 0.5% to about 2.0% by weight. It is to be understood that since the molecular weight of the coating material affects the required total solids content in the coating solution, the concentration of said material therein could, in certain instances, be greater than 5.0% or less than 0.1% by weight.

The coating solutions of the instant invention having a pH in the range of about 9 to about 14 are satisfactory to accomplish the objectives hereof. It is preferred, however, to operate at a pH in the range of 10 to 12. The pH is affected by the kind of cation used to form the salt, such as Na, K, Li, $NH_4$, and the like.

The coating solution is usually applied to the inner reactor surfaces by spraying it on. However, it is also possible to apply the coating solution by flooding the reactor and then draining, or painting, or brushing on, but spraying is the most practical and economical method of application. After spraying the coating solution on the inner surfaces and draining the reactor, the polymerization reaction can be started immediately without further treatment of said surfaces. However, it has been found that excellent results are obtained when, after applying the coating solution to the inner surfaces of the reactor, the coated surfaces are sprayed with water and the reactor drained prior to charging the polymerization reactor with the polymerization mixture or recipe. It should also be pointed out that the coatings defined herein work equally well on glass or metal surfaces, such as stainless steel, and the like.

One important aspect of the present invention is that multiple polymerizations may be run without opening the reactor between charges since, with the spray nozzle or nozzles mounted at strategic points on the reactor, it is possible to reach all inner surfaces thereof while the reactor is closed. Although multiple charges may be run in a coated reactor without recoating the surfaces, it has been found to be expeditious to recoat the interior surfaces of the reactor periodically after several charges have been run therein, or after each charge, to insure uniform and efficient production. When it is decided to recoat the reactor, the reactor is drained and the inner surfaces of the reactor are flushed with water. The coating solution is applied to the surface, preferably by spraying, and the reactor is drained of the excess coating solution in such a way that the same can be sent to a recovery system, if desired. Then, optionally, the surfaces having the coating thereon are sprayed with water and the effluent is discarded, or recovered if desired. Thereafter, the reactor is charged with the polymerization medium and ingredients in the usual manner and the reaction commenced immediately with no particular modification of processing techniques being necessary due to the presence of the coating. It is understood, of course, that one can recoat the reactor as often as desired without opening the same, even after every charge is polymerized. Further, utilization of the internally coated reaction vessel of the present invention does not adversely affect the heat stability or other physical and chemical properties of the polymers produced therein.

While the present invention is specifically illustrated with regard to the suspension polymerization of vinyl chloride, it is to be understood that the process and apparatus may likewise to applied in the emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example methyl acrylate, ethyl acrylate, butyl acrylate, octyl acrylate, cyanoethyl acrylate, and the like; vinyl acetate; acrylonitrile; esters of methacrylic acid, such as methyl methacrylate, butyl methacrylate, and the like; styrene and styrene derivatives including α-methyl styrene, vinyl toluene, chlorostyrene, etc.; vinyl naphthalene; diolefins, including butadiene, isoprene, chloroprene, and the like; and mixtures of any of these types of monomers and other vinylidene monomers copolymerizable therewith; and other vinylidene monomers of the type known to those skilled in the art.

The present invention, however, is particularly applicable to the suspension polymerization of vinyl chloride, either alone or in a mixture with one or more other vinylidene monomers having at least one terminal $CH_2=C<$ grouping copolymerizable therewith in amounts as great as about 80% or more, by weight, based on the weight of the monomer mixture, since polymer buildup in the reaction vessel is a particularly bad problem here.

The polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures, polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional makeup liquid containing the monomer or monomers in the same proportions as at start-up. Upon the addition of a certain predetermined amount of liquid, the polymerization reaction is terminated, usually by the addition thereto of a shortstopping agent. The necessity for the addition of liquid is due to the shrinkage in volume of the reaction medium produced by the conversion of the monomer or monomers to the polymeric state.

In order to rate the various coatings, there has been devised a rating scale with respect to "paper" and "sandy" buildup. An uncoated reactor, where normal amounts of both types of buildup occur, is given a rating of 1.5 to 2.0. Any rating below 1.0 is good, or a definite improvement. In other words, 0.0 rating is perfect, and so on.

To further illustrate the present invention, the following specific example is given. It is to be understood, however, that this is merely intended in an illustrative and not limitative sense. In the example, all parts and percents are by weight unless otherwise indicated.

EXAMPLE I

In this example, three reaction products were used for coating the internal surfaces of a 3 liter polymerization reactor. The reaction products were those produced by the reaction of (1) resorcinol plus benzaldehyde using sulfuric acid as a catalyst; (2) resorcinol plus benzaldehyde using sodium hydroxide as a catalyst; and (3) resorcinol plus 4-methoxybenzaldehyde using sulfuric acid as a catalyst.

When using sulfuric acid as the catalyst (products (1) and (3)), the resorcinol (2 moles) is dissolved in 1,4-dioxane in a reaction flask equipped with a reflux condenser. With stirring, the sulfuric acid (about 15% by weight of the total reaction mixture) is slowly added. Then the benzaldehyde or 4-methoxybenzaldehyde (1 mole) is added dropwise with stirring. The reaction flask is then heated with stirring and the contents refluxed for 2 hours at 115°–120° C. Thereafter the condenser is replaced with a stillhead and the water-dioxane volatiles distilled over. The reaction mixture is cooled, dissolved in aqueous NaOH and then the product is precipitated by the addition of HCl. The product is recovered by filtration, dried and ground to the desired particle size.

When using sodium hydroxide as the catalyst (product (2)), 100 mls. of 1,4-dioxane and 50 gms. of resorcinol were added to a reaction flask equipped with a reflux condenser. Then 32 ml. of benzaldehyde were added and the mixture stirred. Then 10 ml. of a 50% aqueous NaOH solution added. Thereafter the mixture was stirred and heated at a temperature of 115°–120° C. and refluxed for 1 hour. Then the condenser was replaced with a stillhead and the water-dioxane volatiles distilled over. After the reaction mixture was cooled, the product was recovered by dissolution in dilute caustic and precipitation with HCl, filtered, dried and ground to the desired particle size.

The three products, or oligomeric coating materials, were dissolved in 1% NaOH to give 1% by weight coating solutions. In the case of each solution, the internal surfaces of a 3 liter stainless steel reaction were cleaned with an abrasive cleaner. The surfaces were then sprayed with the coating solution and then rinsed with water. After coating, the following polymerization recipe was charged to the reactor:

| Ingredient | Parts |
| --- | --- |
| Vinyl Chloride | 100 |
| Water (demineralized) | 207 |
| Polyvinyl alcohol[(1)] | 0.05 |
| Di-(secondary butyl) peroxydicarbonate | 0.05 |

[(1)]88% hydrolyzed polyvinyl acetate

The contents of the reactor were heated to 57° C. and the temperature maintained there throughout the reaction cycle. Water was continuously added to the reactor in order to maintain the volume, due to shrinkage by reason of formation of polymer. When 33.45 parts of water had been added, the reaction was stopped by cooling the mixture rapidly. The reactor was emptied and the polymer (PVC) recovered by filtration curd drying. The interior surfaces were rated for any buildup and then rinsed with water. Without recoating the internal surfaces of the reactor, the same procedure was followed in two additional runs or polymerization cycles. The surfaces were evaluated after each run. Also, a control run was made using the same recipe but in an uncoated reactor. The buildup ratings are set out in the following table:

TABLE I

| | Run 1 | | Run 2 | | Run 3 | |
| --- | --- | --- | --- | --- | --- | --- |
| | Paper | Sandy | Paper | Sandy | Paper | Sandy |
| Control | | | | | 1.5 | 2.0 |
| Coating No. 1 | 0.0 | 0.0 | 0.0 | 0.2 | 0.0 | 0.6 |
| Coating No. 2. | 0.1 | 0.1 | 0.2 | 0.0 | 0.3 | 0.1 |
| Coating No. 3. | 0.0 | 0.1 | 0.0 | 0.1 | 0.2 | 0.2 |

The above results clearly show the improvement in reduction of polymer buildup obtainable with the present invention.

Coating of the internal surfaces of the polymerization reactor, in accordance with the present invention, substantially reduces, and in many cases, practically eliminates the polymer buildup on said surfaces during the polymerization reaction and thus results in increased production over a unit period of time. More importantly, the present invention enables one to operate a closed polymerization system, which, in the case of vinyl chloride polymerization, has the advantage of drastically reducing the parts per million of vinyl chloride in the atmosphere of the plant. Such reduction of vinyl chloride in the atmosphere meets U.S. Government requirements. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

We claim:

1. A polymerization reaction vessel having on all the internal surfaces thereof a coating comprised of the sodium salt of an oligomer(s) having the general structure

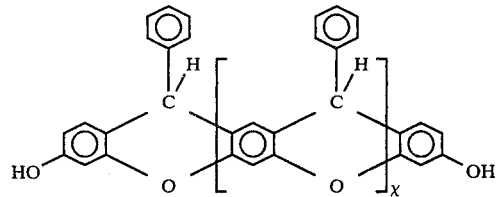

wherein $\chi$ is an integer from 0 to 10, said oligomer(s) being the reaction product of benzaldehyde and resorcinol and wherein the coated surface are characterized by having a critical surface tension of at least 72 dynes/centimeter and a contact angle with water of about zero.

* * * * *

UNITED STATES PATENT AND TRADEMARK OFFICE
CERTIFICATE OF CORRECTION

PATENT NO. : 4,579,758
DATED : April 1, 1986
INVENTOR(S) : John L. Dorsch, et al It is certified that error appears in the above-identified patent and that said Letters Patent are hereby corrected as shown below:

The inventor's name should be changed from "John David Smith" to --DAVID JOHN SMITH--.

Signed and Sealed this

First Day of July 1986

[SEAL]

Attest:

DONALD J. QUIGG

Attesting Officer     Commissioner of Patents and Trademarks